(12) United States Patent
Kamieniecki (10) Patent No.: US 10,018,738 B2
(45) Date of Patent: Jul. 10, 2018

(54) INDUCTIVE RADIATION DETECTOR

(71) Applicant: Emil Kamieniecki, Bedford, MA (US)

(72) Inventor: Emil Kamieniecki, Bedford, MA (US)

(\*) Notice: Subject to any disclaimer, the term of this patent is extended or adjusted under 35 U.S.C. 154(b) by 0 days.

(21) Appl. No.: 15/413,912

(22) Filed: Jan. 24, 2017

(65) Prior Publication Data

US 2017/0269239 A1   Sep. 21, 2017

Related U.S. Application Data

(60) Provisional application No. 62/309,723, filed on Mar. 17, 2016.

(51) Int. Cl.
*G01T 3/08* (2006.01)
*G01T 1/24* (2006.01)
*G01T 7/00* (2006.01)

(52) U.S. Cl.
CPC ............. *G01T 3/08* (2013.01); *G01T 1/24* (2013.01); *G01T 7/00* (2013.01); *Y02E 10/50* (2013.01)

(58) Field of Classification Search
CPC ..... G01T 1/24; G01T 3/08; G01T 7/00; Y02E 10/50
See application file for complete search history.

(56) References Cited

U.S. PATENT DOCUMENTS

| | | | |
|---|---|---|---|
| 4,149,075 A | 4/1979 | Drukier et al. | |
| 5,070,241 A * | 12/1991 | Jack | G01J 5/10 250/336.1 |
| 5,276,398 A | 1/1994 | Withers | |
| 6,727,504 B1 | 4/2004 | Doty | |
| 7,145,339 B2 | 12/2006 | Saylor | |
| 7,898,280 B2 | 3/2011 | Kamieniecki | |
| 8,896,338 B2 | 11/2014 | Kamieniecki | |
| 2008/0036462 A1 * | 2/2008 | Schiano | G01R 33/34053 324/318 |
| 2010/0060307 A1 * | 3/2010 | Kamieniecki | G01R 31/2648 324/754.21 |

FOREIGN PATENT DOCUMENTS

WO    2014207144 A1    12/2014

OTHER PUBLICATIONS

Bolotnikov, A.E. et al., "Array of Virtual Frisch-Grid CZT Detectors With Common Cathode Readout for Correcting Charge Signals and Rejection of Incomplete Charge-Collection Events" IEEE Transactions on Nuclear Science, vol. 59, No. 4, pp. 1544-1551 (Aug. 2012).

(Continued)

*Primary Examiner* — Marcus Taningco
(74) *Attorney, Agent, or Firm* — David Millers (57) ABSTRACT

A radiation detector includes a block of a material capable of interacting with ionizing radiation to produce charge carriers, an inductor positioned adjacent to the block and having an inductance that depends on a number of the charge carriers in the block, and a sensing circuit coupled to sense a change in the inductance and detect the ionizing radiation base on the change. The sensing circuit may particularly contain an RF synthesizer that drives the inductance, e.g., an LC circuit containing the inductance, and an analyzer that detects changes in the response of the inductance.

20 Claims, 6 Drawing Sheets

(56) References Cited

OTHER PUBLICATIONS

Bolotnikov, A.E. et al., "High-Efficiency CdZnTe Gamma-Ray Detectors" IEEE Transactions on Nuclear Science, vol. 62, No. 6, pp. 3193-3198 (Dec. 2015).
Bray, Hiawatha "Port of Boston security gets big helping scan" Boston Globe (Feb. 3, 2016).
Gurler, Necip et al., "FEM based Design and Simulation Tool for MRI Birdcage Coils including Eigenfrequency Analysis" Proceedings of the COMSOL Conference in Milan (2012).
Hayes, Cecil E. et al., "An Efficient, Highly Homogeneous Radiofrequency Coil for Whole-Body NMR Imaging at 1.5 T" Journal of Magnetic Resonance 63, pp. 622-628 (1985).
Kamieniecki, Emil, "Defect specific photoconductance: Carrier recombination through surface and other extended crystal imperfections" Journal of Applied Physics 112, 063715, pp. 063715-1 to 063715-8 (2012).
Kamieniecki, Emil, "Effect of defect clusters on carrier recombination in high-resistivity CdZnTe" Journal of Applied Physics 114, 193701, pp. 193701-1 to 193701-4 (2013).
Kamieniecki, Emil, "Effect of charge trapping on effective carrier lifetime in compound semiconductors: High resistivity CdZnTe" Journal of Applied Physics 116, 193702, pp. 193702-1 to 193702-5 (2014).
Maity, T.C. et al., "Realization of highly efficient hexagonal boron nitride neutron detectors" Applied Physics Letters 10, 072101, pp. 072101-1 to 072101-4 (2016).
A.D.Elster, Birdcage RF coil—Questions and Answers in MRI, MRIquestions.com, pp. 1/2 and 2/3, Nov. 4, 2016.
Kollar, Dusan, Pulse processing and Analyses, Detector equivalent circuits, http://www.dnp.fmph.uniba.sk/~kollar/ie_w/el2.htm, pp. 1-19, (2016).

\* cited by examiner

INDUCTIVE RADIATION DETECTOR

CROSS-REFERENCE TO RELATED APPLICATIONS

This patent document claims benefit of the earlier filing date of U.S. provisional Pat. App. No. 62/309,723, filed Mar. 17, 2016.

BACKGROUND

Radiation detectors have been used in security, defense, safety, scientific, medical and industrial applications and may detect many types of ionizing radiation, e.g., gamma rays, X-rays, and nuclear particles. One particularly critical use for radiation detectors is for security, for example, cargo inspection to guard against terrorist smuggling a dirty bomb or other radioactive material in commercial shipments, but radiation detectors are not limited to use for cargo inspection or even security applications. More generally, individual radiation detectors and networks of radiation detectors may be widely needed, for example, for securing national borders, as part of the regular inventory of law enforcement agencies and fire departments, and for installations or use at transportation hubs, entertainment venues, road intersections, or any populated areas, for detection of dangerous or illicit radioactive material.

Radiation detectors in many applications may not only need to detect radioactive materials but may also need to identify or differentiate materials, for example, to avoid triggering false alarms. In particular, a radiation detector may need to distinguish illicit or dangerous radioactive materials from naturally-occurring radioactive material or medical isotopes. Isotope identification through emission spectrum analysis is possible but may require expensive gamma-ray detectors with high energy resolution and a wide detection bandwidth covering both low and high energy gamma-rays. Neutron detectors, which are important in scientific research and nuclear reactor operation, may also distinguish illicit radioactive material because few naturally occurring materials emit neutrons. The most common type of neutron detectors currently uses pressurized tubes containing helium-3 gas and are typically bulky, costly, and difficult to configure.

Satisfying the growing need for radiation detectors may require low-cost, room-temperature operation, high energy resolution, and high-efficiency detection of ionizing radiation including gamma-rays and nuclear particles.

SUMMARY

In accordance with an aspect of the invention, an ionizing radiation sensor may include a semiconductor or insulator block having an electrical characteristic that measurably changes when the block interacts with radiation. A sensing circuit can then monitor the electrical characteristic and detect radiation when the radiation interacts with the sensing block. In one configuration, a semiconductor or insulating block sensitive to the radiation is additionally exposed to the radio frequency (RF) electromagnetic radiation, which is affected by the charge carriers that the radiation frees in the block, and the sensing circuit can detect the radiation based on a change in the RF radiation, e.g., by measuring the RF radiation remaining after absorption by the freed charge carriers in the sensing block. In particular, RF signal processing may be used to detect the interactions of radiation with a sensing block, for example, to detect the number of charge carriers that are freed by a single quantum of ionizing radiation or nuclear particle and thereby to determine the energy of the quantum of radiation or particle.

One specific implementation is a radiation detector including a sensing block, an inductor, and a sensing circuit. The sensing block may be made of a material capable of interacting with radiation to produce charge carriers in the block and may particularly be a block of semiconductor or insulator. The inductor may be positioned adjacent to or may incorporate the block, so that a property, e.g., the inductance or the quality factor, of the inductor or a circuit including the inductor depends on a number of the charge carriers in the block. The sensing circuit consisting, for example, of the inductor and a capacitor forming an LC resonance circuit can then be coupled to the sensing circuit to sense a change in the inductor and thereby detect the ionizing radiation based on the change.

Another specific implementation is a radiation detector including an RF synthesizer branch, a sensor branch, and an analyzer branch. The RF synthesizer branch may generate an input RF signal that the sensor branch receives. The sensor branch may include a sensing block and a circuit that is associated with the sensing block, and the circuit may be connected so that the sensor branch has an electrical characteristic, e.g., a resonance characteristic, that depends on charge carriers created in the sensing block by radiation. The analyzer branch may in turn be coupled to receive an output RF signal altered by the effect of the sensor branch on the input RF signal. (A reference or balancing branch may be employed to enhance the ability of the analyzer branch to measure the changing characteristic of the sensor branch.)

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

An ionizing radiation sensor may have one or more electrical characteristics that depend on the number of free charge carriers in a sensing block. The sensing block may particularly contain a semiconductor or insulator having an electrical characteristic that measurably changes when interactions with radiation create charge carriers in the sensing block. A sensing circuit can monitor the electrical characteristic of the sensor and detect ionizing radiation when an interaction of the radiation with the sensing block changes the monitored electrical characteristic. In one implementation, the ionizing radiation sensor containing a semiconductor or insulating sensing block further includes circuitry having a resonance, e.g., an LC resonance, that changes when ionizing radiation frees charge carriers in the sensing block, and the sensing circuit can detect ionizing radiation based on a change in the resonance, e.g., changes in the resonance frequency or quality factor. In particular, radio frequency (RF) signal processing may be used to detect the interactions of radiation with a sensing block and to detect changes due to interaction of a single quantum of radiation with the sensing block.

Figure 1:
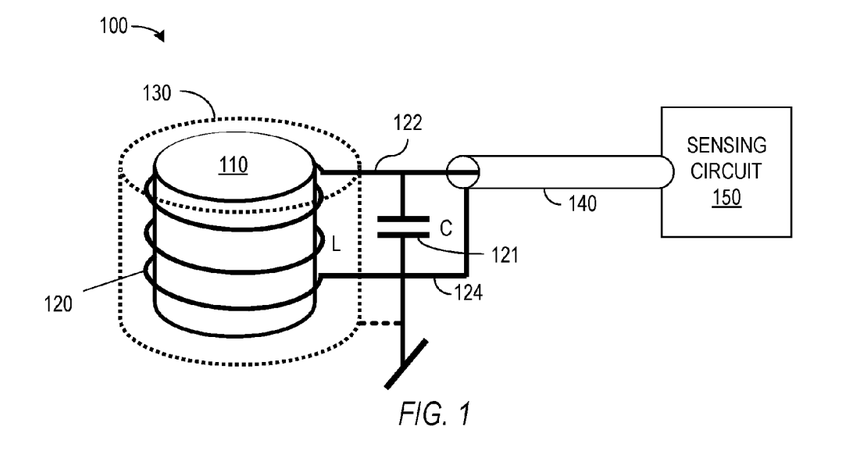
FIG. 1 shows a radiation detector in accordance with an implementation employing an inductive coil surrounding a core of semiconductor or insulator material.

FIG. 1 shows an exemplary implementation of a radiation detector 100 including a semiconductor or insulator block 110 coupled to an inductor 120 and capacitor 121. Block 110 may, for example, be a solid cylindrical block of an insulating or semiconductor material, and inductor 120 may be a coil of wire wrapped helically in one or more layer around cylindrical block 110. Capacitor 121 may be a separate component or may result from the inherent capacitance of shielding or conductors as described further below.

The material used in block 110 may be monocrystalline or non-monocrystalline, for example, polycrystalline blocks or films, chosen according to the radiation to be sensed but is preferably electrically resistive, e.g., an insulator or a semiconductor, with low density of charge carriers. For sensing of thermal neutrons, for example, block 110 may contain $^{10}$B (boron with atomic weight 10), which is an isotope capable of capturing neutrons and then quickly decaying to produce $^{7}$Li (lithium with atomic weight 7) and α (alpha particles). Daughter particles ($^{7}$Li and α) created from the nuclear reactions generally have large kinetic energies and interact with block 110 producing free electrons and holes. One suitable boron containing semiconducting material is hexagonal boron nitride (h-BN), but other boron containing materials may be used. For X-ray or gamma-ray detection, block 110 may be made of Cadmium Zinc Telluride (CdZnTe, CZT), Cadmium Manganese Telluride (CdMnTe, CMT), Cadmium Telluride (CdTe), Mercury Iodide (HgI$_2$), Thallium Bromide (TlBr) or other high-Z semiconductors. An x-ray or gamma-ray interacting with an insulator or semiconductor may produce one or more electron-hole pairs. In general, when block 110 is exposed to radiation such as x-rays, gamma-rays, or nuclear particles, the reaction of the radiation with the material of block 110 produces charge carriers in electrically resistive block 110. The electrical characteristics, e.g., the resistivity and the electrical permittivity, of block 110 and associated sensing circuitry may change as a result of charge carrier creation.

Inductor 120, being inductively coupled to semiconductor or insulator block 110, may have properties that depend on electrical characteristics of block 110 and therefore on the number of the charge carriers produced by the ionizing radiation in block 110. Inductor 120, in some implementations, may be part of an LC circuit that is tuned to a resonant frequency in an RF range or more specifically in an ultrahigh frequency (UHF) range. In one embodiment, inductor 120 may be solenoid coil wound around semiconductor or insulator block 110 and may be attached to semiconductor or insulator block 110 with an insulating epoxy. Such a configuration is particularly useful for high-energy applications such as gamma-rays requiring a large volume for semiconductor or insulator block 110.

An all-around, light-tight electrical shield 130 may surround block 110 and inductor 120 to shield inductor 120 and capacitor 121 from external electromagnetic RF interference and to form a cavity that may increase the uniformity of RF radiation within shield 120 due to reflection from the conductive shield walls. The electrical shield may contribute to capacitance C of capacitor 121 in an LC circuit. In one implementation, shield 130 is cylindrical and made of a conductor such as aluminum or copper. Shield 130 may also be made of a material having a thickness and a composition that makes shield 130 transparent or nearly transparent to the radiation to be detected. Leads 122 and 124 from inductor 120 pass through shield 130 and are electrically connected to a shielded conductor 140, e.g., to a semi-rigid coaxial cable. In the illustrated configuration of FIG. 1, one lead 122 is insulated from shield 130, and the other lead 124 may be electrically coupled to shield 130 and to the shielding in shielded conductor 140, but alternatively, shield 130 may be not connected, e.g., may be electrically floating. Shield 130 may be grounded as shown in FIG. 1, but alternatively, shield 130 may be not grounded, e.g., may be electrically floating. Any space between semiconductor or insulator block 110, inductor 120, and shield 130 may be filled with an insulating epoxy to reduce susceptibility to vibrations.

Inductor 120 with block 110, shield 130, and shielded conductor 140 form a radiation sensor that may act as an LC circuit component, and a resonant frequency of the radiation sensor may be tuned to a frequency of electromagnetic radiation, related to hardware limitations of the sensor 100, sensing circuit 150 and to a range corresponding to a lowest external interference. In any case, a sensing circuit 150 may be surrounded by a conductive shield and through the shielded conductor 140 can detect changes in the electrical characteristics of the sensor including block 110, inductor 120, and capacitance 121 when ionizing radiation interacts with block 110. Some examples for implementations of sensing circuit 150 are described in more detail below.

Figure 2:
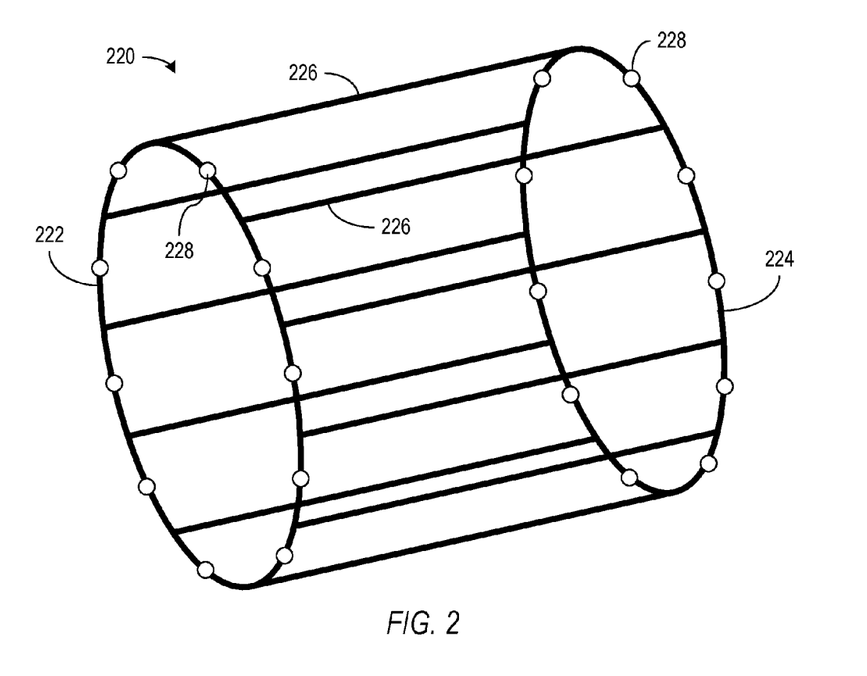
FIG. 2 shows a birdcage coil that may be employed as an inductor in the radiation detector of FIG. 1.

In a case where semiconductor or insulator block 110 has a large volume, a simple wound solenoid coil with semiconductor or insulator core may not match an input impedance, for instance, 50 ohms, desired for sensing circuit 150. In such case inductor 120 may have a different configuration. For example, inductor 120 may be a "birdcage coil" such as birdcage coil 220 of FIG. 2. Birdcage coil 220 generally includes two circular conductive loops 222 and 224, commonly referred to as end rings, connected by an even number of straight conductive elements 226 referred to as rungs or legs. The number of rungs may be chosen according to the size of coil 220 and typically ranges from about 8 to 32 rungs 226. Birdcage coil 220 also contains linking elements 228 such as capacitors in end rings 222 and 224 and located between conducting legs 226, and the arrangement and characteristics of linking elements 228 may be selected according to the frequency characteristics desired for birdcage coil 220 or the circuit containing birdcage coil 220. In a high-pass configuration, birdcage coil 220 may be used with pairs of capacitors located along the end rings, to provide a configuration that approximates a continuous conducting surface. Alternatively, birdcage coil 220 may employ other configurations such as those known in RF-transmitters and particularly those used in clinical magnetic resonance imaging (MRI) devices. Necip Gurler and Yusuf Ziya Ider, "FEM based Design and Simulation Tool for MRI Birdcage Coils including Eigenfrequency Analysis," Proceedings of the 2012 COMSOL Conference in Milan, Italy, describes some aspects of birdcage coil design and implementation.

Figure 3:
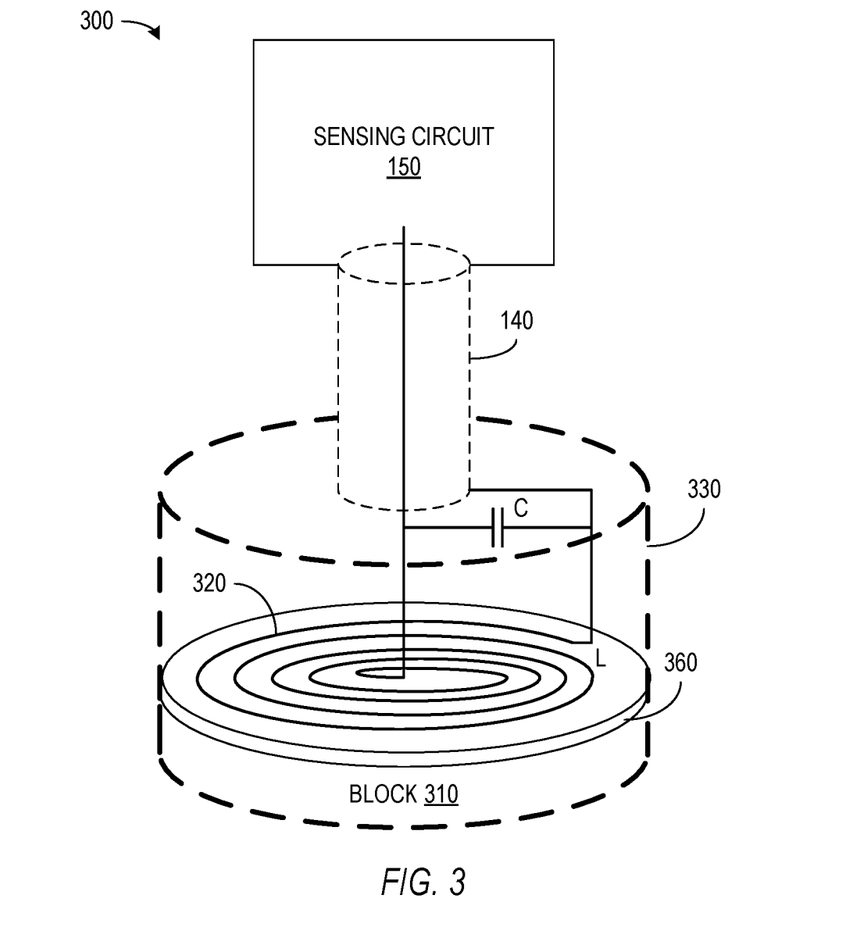
FIG. 3 shows a radiation detector in accordance with an implementation employing a spiral coil adjacent to a flat surface of a sensing block.

FIG. 3 illustrates an ionizing radiation detector 300 employing an insulator or semiconductor block 310 with an alternative coil configuration for an inductor 320. In particular, inductor 320 is a spiral coil adjacent to a flat top surface of block 310. For example, inductor 320 may be a surface coil composed of a single winding or multiple windings attached to a top surface of semiconductor or insulator block 320. The coil configuration for inductor 320 may be particularly useful for sensing neutrons or lower energy ionizing radiation such as X-ray that may employ sensing block 310 with the radiation sensing region (monocrystalline or polycrystalline) located at the surface opposite to the inductive coil 320. Coil 320 and possibly one or more sides of block 310 may be within a shield 330 of a conductive material, which may be transparent to the radiation being detected. Inductor 320 may have leads coupled to shielded conductor 140 and to ground as sensor 100 described above. For X-rays, the radiation sensing region of block 310 may be, for example, formed by attaching or depositing crystalline or polycrystalline CdZnTe or other high-Z layer on a high resistivity or insulating substrate, and for neutrons, the sensing region of block 31 may be fabricated by forming a layer of a suitable semiconductor or insulator, e.g., $^{10}B$ enriched hexagonal boron nitride (h-$^{10}BN$), on a high resistivity or insulating substrate.

Inductor 320, in some implementations, may be separated from semiconductor or insulator block 310 by a conductive shield 360 made, for instance, from aluminum, with a hole (not shown) under inductor 320. For example, conductive shield 360 may have a diameter corresponding to the diameter of shield 330 and a hole with a diameter corresponding to the diameter of the inductor 320. The semiconductor or insulator block 310 may be larger than diameter of the inductor 320. With shield plate 360 between inductor 320 and block 310, shield 330 may not need to surround block 310 to shield inductor 320 from external electromagnetic interference. Shield 360 may limit the active volume of the block 310 sensitive to the radiation, to approximately the volume located under the hole in shield 360 under inductor 320. This configuration may increase uniformity of the RF radiation in the sensing volume improving energy resolution of the sensor. Shield 360 in one embodiment may be connected to a common ground with shield 330, but in another embodiment, shields 360 and/or 330 may not be grounded.

Figure 4:
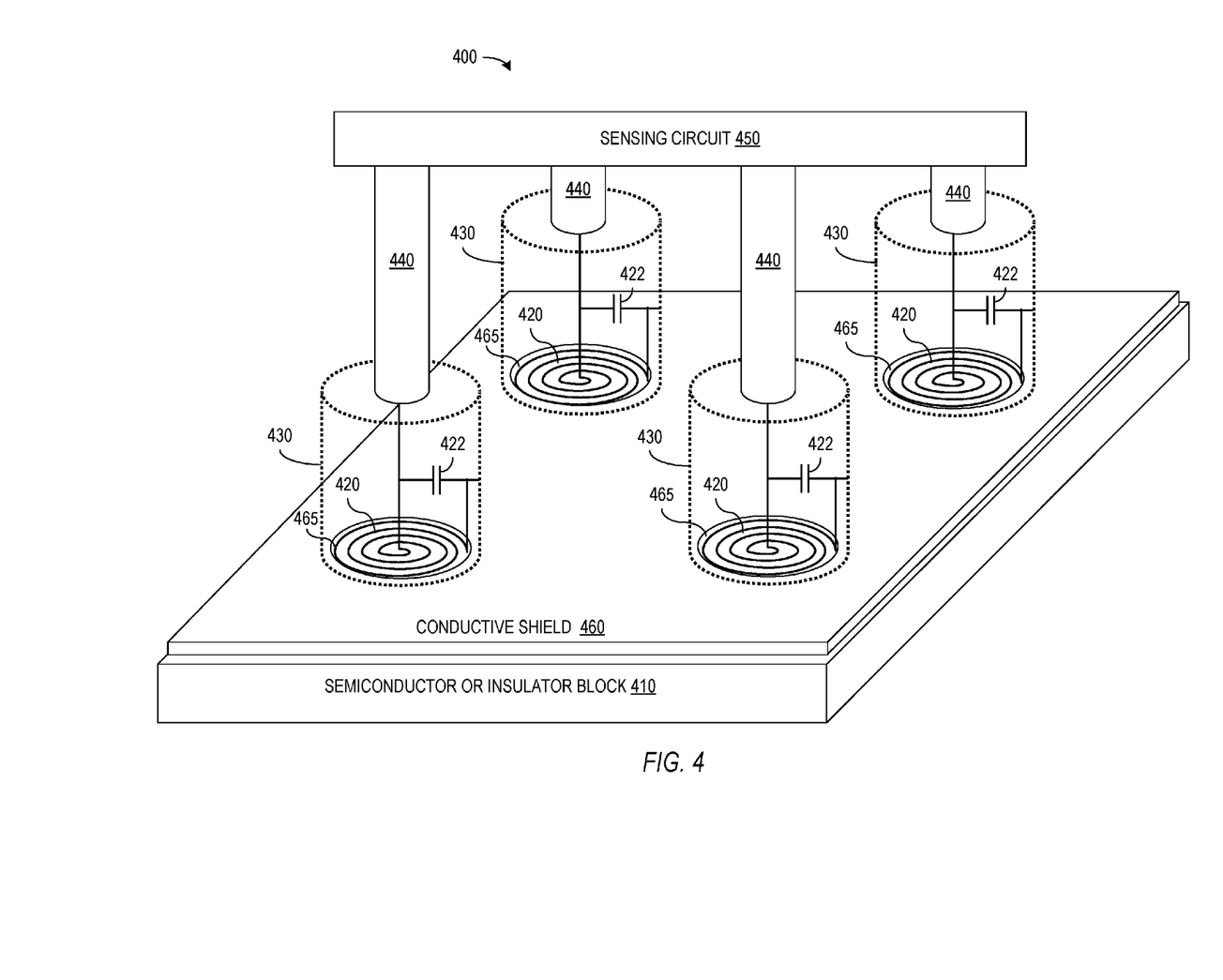
FIG. 4 shows a radiation sensor in accordance with an implementation using a semiconductor or insulator block and multiple sensing coils forming LC resonance circuits for radiation detection, imaging, or directional detection.

The surface coil configuration of FIG. 3 is well suited for use in radiation detectors using a sensor array. FIG. 4, for example, shows an ionizing radiation detector system 400 employing multiple radiation sensors respectively including multiple surface coils 420 overlying a semiconductor or insulator block 410. Each surface coil 420 may be in close proximity to but separated from a single semiconductor or insulator substrate 410, and a conductive shield 460, e.g., a thin sheet of aluminum with openings or holes 465 may extend under coils 420. For example, each coil 420 may be about 2 mm in diameter, and each opening 465 under an associated coil 420 may be about 2 mm in diameter corresponding to diameter of inductors (coil) 420. Each inductor 420 is further connected to an associated capacitor 422 and surrounded by an electromagnetic shield 430 and may connect to a shielded conductor 440 that electrically connects the inductor 420 to a sensing circuit 450.

Ionizing radiation detection system 400 by including multiple inductors 420 may allow system 400 to provide spatial or directional information for the source of detected radiation. In particular, an inductor 420 closer to a radioactive interaction may be expected to provide a stronger signal, which indicates a location of the radioactive interaction within the area of block 410. With an array of inductors, sensing circuit 450 may be able to analyze the respective signal strengths to provide an image of the distribution of radiation over the area of block 410. The directional information may be provided by employing stack of radiation detection system 400 that will allow sensing circuit 450 to determine a direction to the source of radiation and a location of detected radioactive material. Alternatively, sensing circuit 450 may sense multiple inductors 420 collectively in parallel to increase detection efficiency.

A sensor array does not need to use a single sensing block such as employed in system 400 of FIG. 4. For example, one or more of surface coils 420 may be adjacent one or more separate sensing blocks. Also, one or more sensors in an array may be formed using a coil surrounding a semiconductor or insulator core as shown in FIG. 1 or a flat coil on a separate semiconductor or insulator block as shown in FIG. 3. In all these cases, such multi-inductor arrays can be used to locate a direction leading to the radiation source or to form an image of the object emitting ionizing radiation.

An advantage of an array of sensing coils 420 may be improved sensitivity when a large sensing block 410 is employed. In particular, use of a large semiconductor or insulator with a single coil as shown in FIG. 1 or 3 may reduce sensitivity of the detector to radiation since the inductor may be relatively large and distant from a localized radiation interaction in the sensing block. A coil array in any of the disclosed configurations with parallel detection of signals from all coils may increase sensitivity of the detector system due to the reduction of the semiconductor or insulator volume that must be sensed by each inductor.

The ionizing radiation detectors of FIGS. 1, 3, and 4, as described above, each have radiation sensors with inductors inductively coupled to semiconductor or insulator sensing blocks and capacitance connected between the leads of each inductor with coupling to shielding contributing to or replacing this capacitance. The sensors may thus form inductance-capacitance (LC) resonance circuits that are sensitive to the presence of charge carriers in the semiconductor or insulator block. A sensing circuit may subject such a sensor to a radio frequency (RF) signal, preferably ultrahigh frequency (UHF) signal delivered through the shielded conductor and may monitor the effect of the sensor on the RF signal in order to detect radioactive interactions that create charge carriers.

Figure 5:
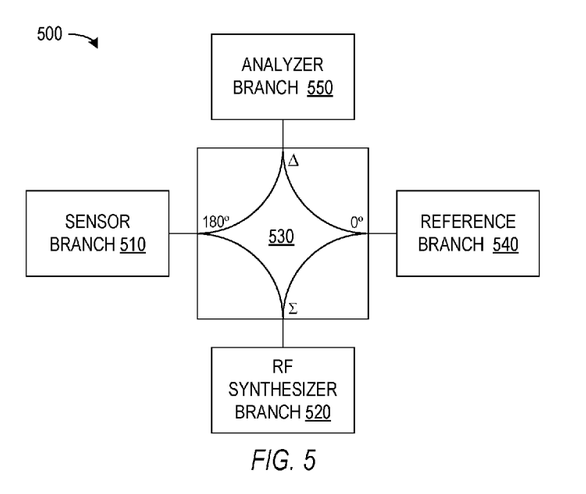
FIG. 5 is a block diagram of a radiation detector in accordance with an implementation employing RF signal processing.

FIG. 5 is a block diagram showing the functional blocks in one implementation of a radiation detector 500 including multiple circuit branches interconnected through an RF bridge 530. A sensor branch 510, for example, may include circuitry and a sensing block that provide a resonance that is in an RF range and that changes when charge carriers are created in the sensing block. Sensor branch 510 may particularly include a semiconductor or insulator block, an inductor inductively coupled to the block, and shielded electrical connections, as illustrated in FIG. 1, 3, or 4 described above, to create together with sensing block a LC resonance. Sensor branch 510 may further contain additional circuitry such as a transformer or other impedance matching circuitry.

An RF synthesizer branch 520 applies an RF signal to an RF bridge 530 that directs the RF signal to sensor branch 510 and to a reference branch 540. Some signal may also be directed to a Δ port of RF bridge 550. Reference branch 540 may be tuned to provide a response that is calibrated with the response of sensor branch 510 when sensor branch 510 is not subjected to ionizing radiation. For example, reference branch 540 may be tuned so that at the RF frequency generated by RF synthesizer 520, reference branch 540 provides a signal attenuation that matches the signal attenuation of sensor branch 510 when sensor branch 510 is not subjected to ionizing radiation. Additionally, the signal reflected from reference branch 540 may have a phase selected so that the reflected signals from sensor branch 510 and reference branch 540 approximately cancel each other at a Δ port of RF bridge 530 when sensor branch 510 is not subjected to ionizing radiation. Further reduction of the signal at a Δ port of RF bridge 530 when sensor branch 510 is not subjected to ionizing radiation can be accomplished using impedance tuning or matching circuitry in the sensor branch 510 to match phase of the signal reflected from the sensor branch 510 to that directed from the RF synthesizer branch 520 to a Δ port of RF bridge 550 and tuning the signal reflected from reference branch 540 to approximately cancel signals reaching a Δ port of RF bridge 550 both from sensor branch 510 and from synthesizer branch 520. Such matching may be accomplished using additional electronic components or by optimizing electronic components. For example, impedance matching circuitry may employ an added or adjustable capacitor, an adjustable transformer, or length adjustable coaxial cables to name a few options.

Figure 6:
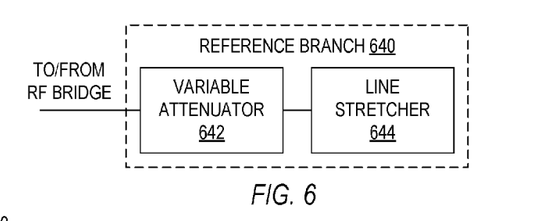
FIG. 6 is a block diagram showing one implementation of a reference branch suitable for use in the radiation detector of FIG. 5.

FIG. 6 shows one implementation of a reference branch 640 that could be employed in radiation detector 500 of FIG. 5. Reference branch 640 generally functions to balance the RF bridge connection to the sensor branch. In the implementation of reference branch 640 shown in FIG. 6, the RF signal from the RF bridge passes through an externally controlled variable attenuator 642 and then to an externally controlled line stretcher 644. Reference branch 640 may end in either an open circuit or a short circuit. If reference branch 640 ends in an open circuit, reference branch 640 reflects the RF signal with no phase shift, and the signal returning to the RF bridge then has a phase shift equal to twice the phase shift of line stretcher 644 and variable attenuator 642. If reference branch 640 ends in a short circuit, reference branch 640 reflects the RF signal with a 180° phase shift, and the signal returning to the RF bridge has a phase shift equal to 180° plus twice the phase shift of line stretcher 644 and variable attenuator 642. By adjusting the attenuation of the variable attenuator 642 and the phase shift of line stretcher 644, the reflected reference signal can be made to cancel the RF signal at the Δ port. Reference branch 640 may thus be tuned so that the RF bridge is in the balanced state where a difference signal from the Δ port is zero or small and thus can be amplified without overloading an output amplifier.

An alternative implementation of a reference branch may replace variable attenuator 642 and line stretcher 644 of FIG. 6 with passive components (inductors, resistors and capacitors). Passive components may reduce electrical noise and increase the stability of the reference branch. The passive components may, however, need to be periodically calibrated or fine-tuned to adjust phase and magnitude of signal reflected from the reference branch and to maintain RF bridge balance while the sensor branch is shielded from the external radiation.

Returning to FIG. 5, difference signal Δ output from RF bridge 530 is the combination of responses from sensor branch 510, synthesizer branch 520, and reference branch 540. Difference signal Δ ideally is flat (or amplitude changes of the balanced signal may be below a desired threshold) when sensor branch 510 is not subjected to ionizing radiation and reference branch 540 and matching circuitry are properly tuned or calibrated. When sensor branch 510 is subject to ionizing radiation, the charge carriers created by a quantum of the ionizing radiation or a nuclear particle change the response of sensor branch 510 creating temporary change of the RF signal at the difference signal Δ output.

An analyzer branch 550 is connected to receive the difference signal Δ output from RF bridge 530 and contains circuitry that analyzes difference signal Δ to detect ionizing radiation. In particular, analyzer branch 550 may detect or analyze pulses in difference signal Δ. A count or frequency of pulses may, for example, indicate a detected radiation dose or rate. Analysis of the size or area of the pulses may indicate the energy of the ionizing radiation interacting with sensor branch 510. For example, a typical approach for analysis of individual pulses may employ a shaping device that will assure a standard decay of each pulse so that pulse area (integration over the pulse) determines number of charge carriers produced and hence energy of the ionizing particle or quantum. If there is no overlap between pulses produced by multiple quanta, a multichannel analyzer can determine a spectrum for pulse energies, which may allow identification of the isotope responsible for the detected radiation. The intensity of radiation may be determined from the count rate that may be determined using a counter, which is standard in radiation monitoring and not included in this description.

Figure 7:
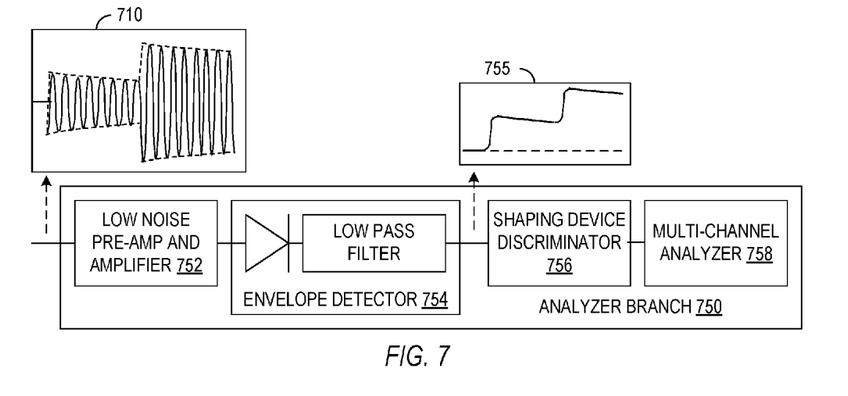
FIG. 7 is a block diagram showing one implementation of an analyzer branch suitable for use in the radiation detector of FIG. 5 and showing typical electrical signal outputs at key stages of the electronics.

FIG. 7 shows one implementation of an analyzer branch 750 that could be employed in radiation detector 500 of FIG. 5. A waveform 710 illustrates a typical analog waveform for difference signal Δ resulting when two consecutive quanta of ionizing radiation interact with a sensor branch. Analyzer branch 750 includes a low noise pre-amplifier and amplifier 752 that amplifies difference signal 710 and an envelope detector 754 that may remove or filter out a carrier RF frequency generated by the RF synthesizer branch. For example, envelope detector 754 may include a rectifier and a low pass filter that produces an amplitude signal having a typical waveform 755 that may result from the difference signal waveform 710. The rectifier may be a diode, for instance, a zero bias Schottky diode, and the low-pass filter may be an integrator or any filter circuit capable of removing high frequency (carrier) component from the difference signal. Envelope detector 754 could alternatively be implemented using a variety of analog or digital circuits, and one alternative implementation is described below with reference to FIG. 8.

The properties of the semiconductor or insulator block and the interaction with ionizing radiation (as well as the implementation of the detector electronics) determine the shape of pulses after envelope detection, e.g., the shape of waveform 755. The interaction or stopping time for a single quantum of radiation such as a single alpha particle or an individual gamma-ray photon in semiconductors, insulators, and in general in solids, is typically a few picoseconds. Therefore, the rise time of a pulse is essentially determined by a time constant of the LC circuit in the sensor branch and the bandwidth of the detection electronics, which, for instance, may produce a pulse with a rise time in a range of a few or several nanoseconds. The decay time or persistence of the charge carriers in the semiconductor or insulator sensing block is determined by properties of the sensing block, e.g., the effective recombination lifetime of the electron-hole pairs produced by the quantum of radiation. For presently available semiconductors such as CdZnTe, the effective recombination lifetime can be a several microseconds. Hence the shape of pulses in the envelope signal may resemble a step-like function, which is essentially of the same shape as output signals exiting charge sensitive preamplifiers often used in conventional radiation detectors. (See, for example, the overview of pulse processing for conventional semiconductor radiation detectors described by G. F. Knoll, Radiation Detection and Measurement (4th ed.), John Wiley & Sons, Inc., copyright 2010). Accordingly, shaping device and discriminator 756 and multi-channel analyzer 758 may be of the same types known for conventional, current sensing radiation detectors.

Figure 8:
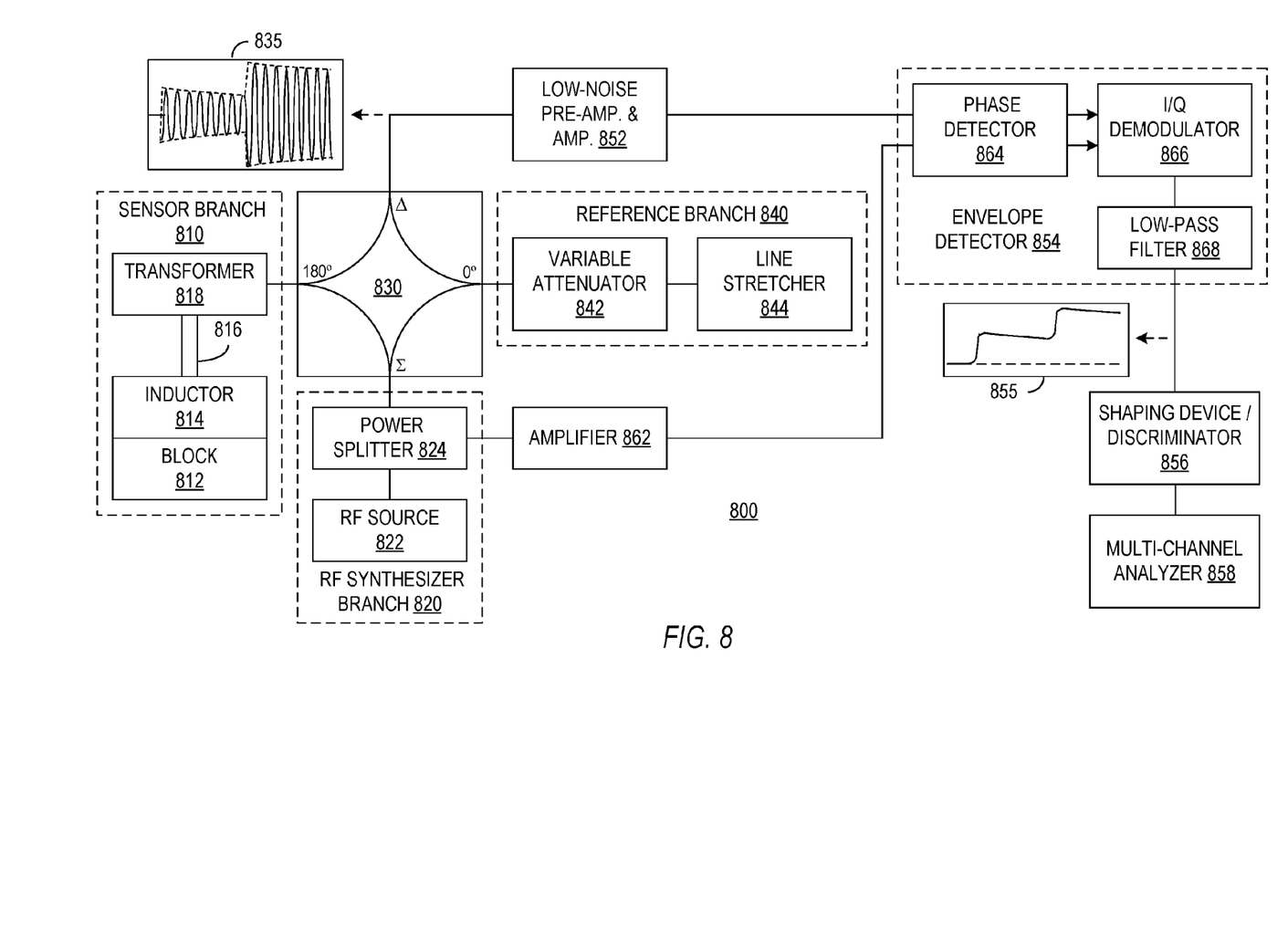
FIG. 8 is a block diagram of a radiation detector and typical electrical signal outputs at key stages of electronics in accordance with another embodiment of the invention.

FIG. 8 shows a more detailed block diagram of an alternative implementation of a radiation detector 800. Radiation detector 800 includes a sensor branch 810, an RF synthesizer branch 820, and a reference branch 840 that are interconnected through an RF bridge 830. Sensor branch 810 includes a block 812 of a low carrier density material, e.g., semiconductor or insulator, that interacts with ionizing radiation to be detected, an inductor 814 inductively coupled to block 812 and having associated circuitry, e.g., with capacitance forming parallel LC circuit with inductor, and a shielded conductor 816, which may be similar or identical to systems described above with reference to FIG. 1, 3, or 4.

Sensor branch 810 further includes a transformer 818 to impedance match inductor-capacitor sensor circuit to hybrid 830 but transformer 818 may not be required for other LC circuits. Transformer 818 may particularly be employed when the impedance of sensor branch 810 would otherwise differ from the impedance desired for inputs of RF bridge 830. In one embodiment, coaxial cable 816 of sensor branch 810 is connected to 180-degree port of hybrid 830 through RF transformer 818, such as two transformers of model TC4-11, manufactured by Mini-Circuits, Brooklyn, N.Y., connected in series. The use of transformer 818 may ensure that the impedance of sensor branch 810 matches the input impedance, e.g., 50 Ohms, of hybrid 830. In an alternative embodiment, the diameter of detection coil and the number of windings of inductor 814, even for a low-energy radiation application, are selected such that sensor branch 810 matches the input impedance of the RF hybrid 830 without using transformer 818. Coaxial cable 816 may be connected directly to 180-degree port of hybrid 830 without the need for transformer 818 if the impedance of sensor branch 810 without transformer 818 matches the input impedance of RF bridge 830. In a high-energy application using, for instance, the solenoid coil of FIG. 1 or the birdcage coil of FIG. 2, the impedance of sensor branch 810 can be made to match the input impedances of the hybrid 305, and cable 818 can again be connected directly to the 180-degree port of the hybrid without the need for transformer 818.

RF synthesizer branch 820 includes a programmable RF frequency source 822 that generates an RF signal. RF frequency source 822 may, for example, be a programmable frequency synthesizer that is controlled by an external controller (not shown). A power splitter 824 receives the RF signal from RF source 822, sends a first portion of the RF signal to RF bridge 830, and sends a second portion of the RF signal to the analyzer branch circuitry, e.g., through an amplifier 862 to an envelope detector 854. In an exemplary implementation, RF source 822 may be an RF frequency synthesizer model LMS-152D or LSG-152 available from Vaunix Technology Corporation of Haverhill, Mass. and is capable of generating a signal in a frequency range from 250 MHz to 1,500 MHz. In another exemplary implementation, RF source 822 may be an RF frequency synthesizer model TRF3765 VCO manufactured by Texas Instruments of Dallas, Tex. which may be boosted by a power amplifier such as a PHA1+ manufactured by Mini-Circuits of Brooklyn, N.Y.

RF bridge 830 may be constructed using a 180-degree hybrid coupler, which is a passive RF coupling device having four ports. An example of a suitable hybrid coupler is a model HC-W500-MS available from Universal Microwave Components Corporation of Alexandria, Va. RF synthesizer branch 820 applies an RF signal to the $\Sigma$ port of the hybrid coupler. RF bridge 830 sends half of the RF signal into sensor branch 810 and the other half of RF signal into reference branch 840. Any power reflected from reference branch 840 appears in phase at a $\Delta$ port of RF bridge 830. Any power reflected from sensor branch 840 appears 180° out of phase at a $\Delta$ port of RF bridge 830.

The difference signal, which result from combining returning in-phase and out-of-phase signals, exits RF bridge 830 from the $\Delta$ port to the analyzer branch circuitry of radiation detector 800. In particular, the difference signal passes through a low-noise amplifier 852, and reaches envelope detector 854. In the illustrated implementation, envelope detector 854 includes an RF phase detector 864 that demodulates the difference signal into two output signals representing quadrature components of the incoming difference signal. Output signals from phase detector 864 enter an I/Q quadrature demodulator 866. I/Q quadrature demodulator 866 may be, for instance, model ADL5387 from Analog Devices, Inc., which provides a demodulation bandwidth of about 240 MHz. I/Q quadrature demodulator 866 passes a demodulated signal through low-pass filter 868, which removes high frequency (carrier) component from the signal leaving an envelope signal. Waveform 855 illustrates a typical envelope signal in a case when two consecutive quanta of ionizing radiation interact with block 612 and cause the difference signal to have the waveform 835.

Figure 9:
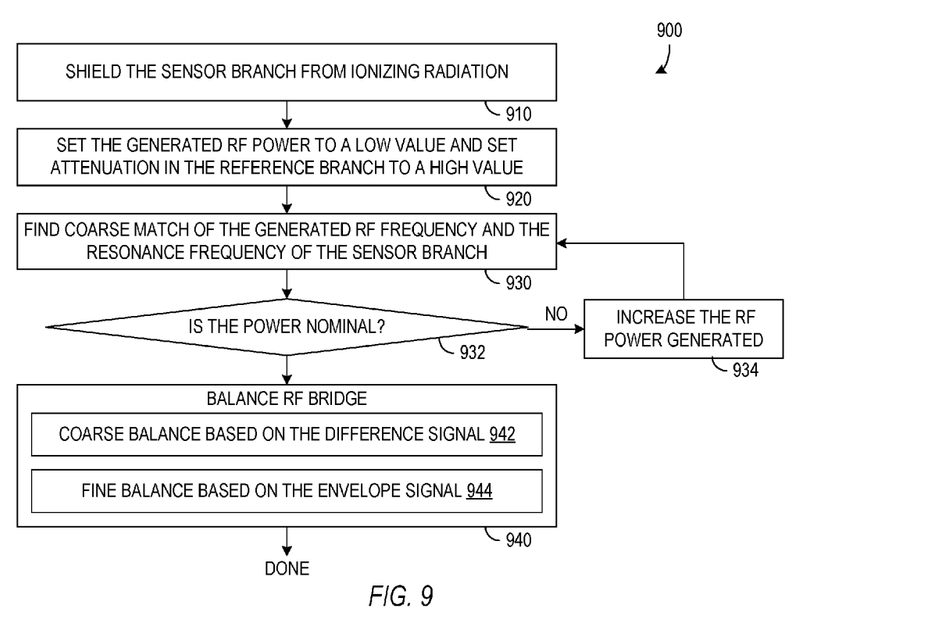
FIG. 9 is a flow diagram of a process for calibrating a radiation detector in accordance with an embodiment of the invention.

Radiation detectors such as disclosed herein may be calibrated at the factory, during start up or use of the detectors, or by a user. FIG. 9 is flow diagram of an exemplary calibration process 900, which may be performed automatically by a controller or manually by a user or manufacturer. Process 900 is described below with particular reference to radiation detector 800 of FIG. 8 but is also applicable to other radiation detector implementations.

Calibration process 900 may require that the sensor branch of the radiation detector, e.g., sensor branch 810 of radiation detector 800, not be exposed to ionizing radiation, and a sub-process 910 shields sensor branch 810 of a radiation detector 800 by employing an additional shield on block 812 or by keeping radiation detector 800 in an environment known to be relatively radiation free. To achieve maximum sensitivity, process 900 calibrates or sets the frequency of the RF signal generated at or near the resonance frequency of the input LC circuit of the sensor branch, e.g., of sensor branch 810. For the frequency calibration, a process 920 sets the generated RF power at a low level, e.g., RF power source 822 may be set at its minimum power level. Process 920 may also initially set the reference branch, e.g., variable attenuator 842 in reference branch 840, for maximum attenuation. Setting the RF synthesizer branch to low power output may prevent system overload, e.g., overload of amplifier 852.

A process 930 is performed to find a coarse matching of the frequency of the generated RF signal and the resonance frequency of the sensor branch of the detector. For example, the output frequency of RF synthesizer branch 820 may be scanned through at least a portion of its frequency range while the response of the sensor branch is monitored. The resonance frequency may be found when the magnitude of the amplified difference signal, e.g., output from low-noise pre-amplifier 852 measured with an external RF power meter is minimized since the sensor branch is most sensitive to absorption of RF power at the resonance frequency. Optionally, this frequency search procedure 930 may be repeated with different output RF power levels until the measured RF power of the difference signal reaches a predetermined nominal power. The nominal power level may be selected according to the linearity of the analyzer branch, particularly amplifier 852 in detector 800 or the range in which detection system is response linearly depends on the input power. In the illustrated implementation of process 900, after each repetition of frequency matching process 930, a decision step 932 determines whether RF power levels are acceptable or optimal for radiation detection, and if not, step 934 changes, e.g., increases, the generated power before process 900 repeats the coarse frequency matching process 930. In some radiation detector implementations, the adjustment or matching to the resonance frequency is computer controlled and performed periodically by automatically scanning the output frequency of RF signal generator.

An alternative embodiment of frequency matching process 930 may set the RF synthesizer branch at a predetermined RF frequency, and then adjust a characteristic of the sensor branch. For example, a capacitance of the LC circuit in the sensor branch may be adjusted for the resonance frequency to match the frequency generated by the RF synthesizer branch.

Once the resonance frequency and the generated RF frequency match and power levels are adjusted, a calibration process 940 balances the RF bridge. For example, starting from a minimized difference signal which provides a coarse null achieved during frequency matching, the phase and magnitude of the difference signal may be adjusted by adjusting reference branch 840. For example, a coarse adjustment sub-process 942 may adjust line stretcher 842 and variable attenuator 844 in reference branch 840 of FIG. 8 in steps, while the difference signal after amplifier (or only preamplifier) 852 is measured using an external RF power meter. The stepping of the reference branch parameters may be repeated until a coarse minimum of the difference signal is achieved. A fine adjustment process 944 to the phase and attenuation may be based on the magnitude of the envelope signal, i.e., based on measurement of the signal output from envelope detector 854 with an external meter, since the envelope signal may provide higher sensitivity. The fine adjustment steps may be repeated until a fine minimum of the envelope signal is achieved. In one embodiment, the coarse and fine minima of signal are defined as values within predefined multiples of the standard deviation of the noise limits of an external meters used to measure the difference and envelope signals, respectively. RF bridge balancing process 940 allows the signals from the sensor branch and the reference branch to be cancelled accurately, preventing saturation of the amplifiers and increasing sensitivity of the radiation detector to small variations in the difference signal. In one embodiment, the fine adjustment of the magnitude and phase of reference branch 840 is computer controlled and automatically performed at periodic intervals.

In another embodiment, in which reference branch 840 relies on passive components such as inductors, resistors, and capacitors, the adjustment of the phase and magnitude of the RF signal reflected from reference branch to maintain RF bridge balancing may be performed periodically while the sensor branch is shielded from the external radiation.

After RF bridge 830 is balanced, a change of carrier density in semiconductor or insulator block 812 affecting the impedance of sensor branch 810 results in a loss of balance of RF bridge 830 and a corresponding change in the difference signal exiting the Δ port. The resulting RF difference signal is amplified in amplifier 852 and passed to envelope detector 854. The output signals of envelope detector 854, e.g., waveform 855 showing two consecutive pulses, may be submitted to shaping device and discriminator 856, and multi-channel analyzer 858.

Detection of ionizing radiation using a semiconductor or insulator sensing block may be achieved as described above using an inductive detection mode. The inductive mode of operation may achieve advantages over conventional radiation detectors that have used a "photoconductor" (or current measurement) mode of operation. In particular, the inductive mode of operation disclosed herein can achieve high energy resolution and sensitivity because the charges produced by ionizing radiation are essentially detected at the position that these charges are created within the time much shorter than effective carrier recombination lifetime. This eliminates a major limitation of the conventional current measuring detectors that can only detect charge carriers created somewhere in the block after they are collected at the electrodes. The photoconductor mode detectors may thus decrease the energy resolution of detectors due to variation of charge collection times associated with random distribution of radiation quanta interactions within the volume of detector and variation of charge collection time due to trapping of charges before charges reach electrodes. A still further advantage over current measuring detectors is that the difference in mobility of electrons and holes does not affect inductive charge carrier detection, and inductive detection does not suffer variable loss of the signal amplitude that occur in current measuring detectors due to charge carrier recombination and trapping on their path to the charge collecting contacts. The larger the detector active volume in current measuring detectors the larger degradation of the energy resolution due to the position-dependent charge collection and carrier trapping. At high radiation energy requiring large active volume, the effect of variable charge collection time can be a dominant contributor to degradation of the energy resolution of radiation spectra, especially those taken under high rate conditions susceptible to pulse pile-up. The inductive mode of operation may also reduce the requirements on the resistance of a semiconductor sensing block and on the bulk and surface leakages of the block.

Another advantage of the inductive mode of operation is that in this mode of operation charges produced by ionizing radiation are detected within the time much shorter than effective carrier recombination lifetime (several nanoseconds vs. several microseconds) and the leading edge and the height of the pulse produced by interaction of a quantum of radiation with the sensing block is essentially independent of the carrier recombination and trapping. With decay of the pulse established by a shaping device, the area under the pulse after shaping device is also essentially independent of the carrier recombination and trapping. This allows use of the lower quality sensing materials either monocrystalline or non-monocrystalline. Inductive detectors may, for example, use polycrystalline, or composite materials instead of the high quality monocrystalline materials that the conventional, current measuring, detectors require. Use of lower quality materials and increased flexibility of sensing block design may substantially lower cost of the radiation detectors.

Although particular implementations have been disclosed, these implementations are only examples and should not be taken as limitations. Various adaptations and combinations of features of the implementations disclosed are within the scope of the following claims.

What is claimed is:

1. A radiation detector comprising:
   an RF synthesizer branch that generates a first RF signal;
   a sensor branch coupled to the RF synthesizer branch, the sensor branch including a sensing block and a circuit that is associated with the sensing block, the circuit being connected so that the sensor branch has an RF characteristic that depends on charge carriers created in the sensing block by radiation; and
   an analyzer branch coupled to receive a second RF signal resulting from an effect of the sensor branch on the first RF signal.

2. The radiation detector of claim 1, wherein the circuit comprises an LC circuit including an inductance that depends on the charge carriers created in the sensing block by radiation.

3. The radiation detector of claim 1, wherein an interaction of the radiation with the sensing block creating charge carriers in the sensing block causes amplitude pulses in the second RF signal.

4. The radiation detector of claim 3, wherein when the sensing block does not contain charge carriers created by radiation in the sensing block, the second signal has an amplitude below a threshold.

5. The radiation detector of claim 1, further comprising:
   an RF bridge connecting the synthesizer branch to the sensor branch and the sensor branch to the analyzer branch; and
   a reference branch coupled to the RF bridge, wherein:
   an analyzer branch receives the second RF signal from the RF bridge; and
   the second signal results from the effect of the sensor branch and an effect of the reference branch on the first RF signal.

6. The radiation detector of claim 5, wherein the reference branch comprises a variable attenuator and a line stretcher that are tuned to minimize an amplitude of the second signal when the sensing block does not contain charge carriers created by radiation.

7. The radiation detector of claim 5, wherein the reference branch comprises passive electronic components with electrical characteristics chosen to minimize an amplitude of the second signal when the sensing block does not contain charge carriers created by radiation.

8. The method of claim 7, further comprising applying a reference signal to the RF bridge while applying the first RF signal, the second RF signal resulting from interaction of the first RF signal and the reference signal with the sensor.

9. The method of claim 8, further comprising tuning the reference signal to minimize the second RF signal when the sensor is not exposed to the radiation.

10. The radiation detector of claim 1, wherein the sensing branch includes an impedance matching circuitry that is tuned to minimize an amplitude of the second signal when the sensing block does not contain charge carriers created by radiation.

11. The radiation detector of claim 1, wherein the RF characteristic is an RF resonance of the sensor branch.

12. The radiation detector of claim 11, wherein a frequency of the first RF signal is equal to a resonance frequency of the RF resonance of the sensor branch when the sensing block does not contain charge carriers created by interaction of radiation with the sensing block.

13. The radiation detector of claim 1, wherein the sensing block comprises:
   a block of a material capable of interacting with radiation to produce charge carriers; and
   an inductor positioned adjacent to the block and having an inductance that depends on a number of the charge carriers in the block.

14. The radiation detector of claim 13, wherein the material is an insulator or a semiconductor.

15. The radiation detector of claim 13, wherein the sensing block further comprising an electromagnetic shield around the inductor and forming an RF cavity containing the inductor.

16. The radiation detector of claim 13, wherein the material of the block is selected from a group consisting of a semiconductor containing $^{10}$B, Cadmium Zinc Telluride (CdZnTe), Cadmium Manganese Telluride (CdMnTe), Cadmium Telluride (CdTe), Mercury Iodide (HgI$_2$), Thallium Bromide (TlBr), and other high-Z semiconductors.

17. The radiation detector of claim 13, wherein the material of the block comprises a mono-crystalline, poly-crystalline or non-monocrystalline material.

18. The radiation detector of claim 1, wherein the radiation is selected from a group consisting of X-rays, gamma-rays, neutrons, and nuclear particles other than neutrons.

19. A method for detecting radiation comprising:
   exposing a sensor for radiation detection, the sensor having an RF characteristic that changes when the sensor is exposed to radiation;
   applying a first RF signal to the sensor;
   analyzing a second RF signal that results from an effect of the sensor on the first RF signal; and
   detecting the radiation based on results of the analyzing of the second RF signal.

20. The method of claim 19, wherein applying the first RF signal comprises applying the first RF signal through an RF bridge coupled to the sensor.

* * * * *